United States Patent Office 3,510,471
Patented May 5, 1970

3,510,471
NOVEL POLYETHER POLYOLS AND PROCESS
FOR PREPARING THE SAME
Leslie Catron Case, 14 Lockeland Road,
Winchester, Mass. 01890
No Drawing. Filed Mar. 9, 1967, Ser. No. 621,768
Int. Cl. C07c 47/18; C08g 22/44
U.S. Cl. 260—209
13 Claims

ABSTRACT OF THE DISCLOSURE

This invention deals with novel fluid polyether polyols having a weighted average functionality of at least eight, and usually higher. In spite of their very high functionality, these polyols possess unusually low viscosities. The instant polyols are prepared by the base-catalyzed alkoxylation of a mixture of a higher polysaccharide and an aliphatic polyalcohol using a lower alkylene oxide. These polyols are compatible with and react with organic polyisocyanates to form polyurethanes with excellent physical properties.

BACKGROUND OF THE INVENTION

Field of the invention

This invention is concerned with novel fluid polyether polyols useful in preparing polyurethane compositions. More particularly this invention is concerned with polyether polyols derived from polysaccharides having more than three monosaccharide units per molecule.

Description of the prior art

Polyether polyols can be reacted with organic polyisocyanates and they are important polymer intermediates widely used in the preparation of polyurethane compositions, in particular polyurethane foams. The prior art describes numerous polyether polyols prepared by the alkoxylation of saturated aliphatic polyalcohols, such as glycerol, trimethylolalkanes, pentaerythritol, sorbitol, and the like. U.S. Pats. 2,902,478, 2,927,918, 3,153,002, 3,167,538 and 3,222,357 additionally describe, polyoxyalkylene adducts of lower, mono- and di-saccharides, such as alpha-methylglucoside and sucrose. Alkoxylated starches and partially hydrolyzed starches have also been described in the art. However, these materials are solid at room temperature and are not miscible or compatible with the organic polyisocyanate and the halocarbon and hydrocarbon blowing agents generally used in the preparation of rigid polyurethane foams.

In judging the desirability of a particular type of polyol for the preparation of rigid polyurethane foams three principal polyol properties have to be considered in addition to cost: the polyol functionality, the polyol viscosity at room temperature, and the compatibility of the polyol with the organic polyisocyanate and with the other essential formulation ingredients, in particular with the very desirable halocarbon blowing agents used in the art.

Rigid polyurethane foams based on trifunctional polyols alone are not widely used commercially because of poor physical properties. As the polyol functionality increases, the physical and chemical properties of the final foam are improved, and desirably the polyol functionality should be as high as possible to ensure good foam properties. At the same time, the polyol viscosity should be suitably low at room temperature to permit ready handling and mixing with polyisocyanate reactants and blowing agents, and the polyol should be completely miscible with sizable proportions of these reactants.

Unfortunately the requirements of low viscosity and good compatibility, e.g. good mutual solubility, with organic compounds have up to now hampered the attainment of optimally high polyol functionality, since the polyols with high functionality are solids or extremely viscous fluids and tend to be incompatible with polyisocyanates and halocarbon blowing agents. Alternatively, relatively low-functionality polyols with the requisite low viscosity and good compatibility yield rigid polyurethane foams with poor physical properties.

SUMMARY OF THE INVENTION

The present invention provides novel fluid polyols of very high functionality yet surprisingly low room-temperature viscosity and good compatibility with organic polyisocyanates and other reactants used in the preparation of polyurethane compositions. The novel polyols provided by the present invention consist essentially of the alkoxylation products of a mixture of (1) a polyfunctional saturated aliphatic polyol having at least three carbon atoms and at least three hydroxyl groups and (2) a polysaccharide having at least three monosaccharide units per molecule. The novel polyols are thus essentially composed of (1) from about 10 to 95 percent, and preferably from 20 to 80 percent, by weight of a polyether polyol of the general formula:

$$P\text{—}\{\text{—O—}(R\text{—O})_n\text{—H}\}_f$$

wherein P is identical with the organic residue P attached to the alcoholic hydroxyl groups in a saturated aliphatic alcohol $P(OH)_f$ of at least three carbon atoms, $f$, the functionality, is a positive integer with a value of at least three, R represents a saturated aliphatic 1,2-alkylene radical of from two to six carbon atoms and of the general formula $$-CH_2-CH- \\ \phantom{-CH_2-}\overset{|}{R'}$$

with R′ being a saturated lower alkyl radical, $n$ is a positive number with an average value ranging from about 1.0 to about 3.0, and (2) from about 90 to 5 percent, and preferably from about 80 to 20 percent by weight of a polyether polyol of the general formula:

$$S\text{—}\{\text{—O—}(R\text{—O})_n\text{—H}\}_{f'}$$

wherein S is the organic residue attached to the active-hydrogen-containing groups of a polysaccharide having at least three mono-saccharide units per molecule, $f'$, the functionality is a positive integer with a minimum value of at least 11, and $n$ and R have the previously assigned meanings.

The weighted-average functionality of the polyols of the present invention will range from at least 8, and preferably from at least 12 to as much as about 100 or higher. The functionality of an individual polyol is defined as the number of hydroxyl groups per polymer molecule. When dealing with mixtures of two or more individual polyols, the overall polyol functionality of the mixtures becomes an average value. The average value which I have found to be especially important in influencing the final polyurethane foam properties is the weighted-average functionality, $\bar{f}$. This average functionality, $\bar{f}$, is calculated by summing the products of equivalents of hydroxyl per each polyol multiplied by the functionality of that polyol, and dividing this sum by the total equivalents of hydroxyl groups in the polyol mixture. Stated in mathematical form, the weighted-average functionality is obtained by summing over an index $i$ (that is, each polyol component in turn is the $i$ the component of the mixture):

$$\bar{f} = \frac{\sum_{i=1}^{i=m}(\text{equivalents of OH in polyol } i)(\text{functionality of polyol } i)}{\sum_{i=1}^{i=m}(\text{equivalents of OH in polyol } i)}$$

wherein Σ is the mathematical symbol indicating summation of all members of the series, $i$ is the index on which the summation is conducted, and there are $m$ different polyols in the mixture. To illustrate, for a two-component polyol mixture, the weighted-average functionality would be equal to:

(equivalents of OH radicals in polyol 1) (functionality of polyol 1) plus
(equivalents of OH radicals in polyol 2) (functionality of polyol 2) divided by the sum of
(equivalents of OH radicals in polyol 1) plus
(equivalents of OH radicals in polyol 2).

Thus, for a polyol mixture consisting of one mol of glycerol and one mol of sorbitol, the average weighted functionality would be five, and for a mixture composed of ⅓ mol of glycerol and ⅔ mol of sucrose, the weighted average functionality would be about 7.2.

The novel high-functionality polyols of this invention have average equivalent weights ranging from about 90 to about 200. The average hydroxyl number will range from about 280 to 620. These polyols are further characterized by having viscosities which range from about 1000 centipoises to about 1,000,000 centipoises, and frequently do not exceed 200,000 centipoises, as measured with a rotating spindle viscometer at 25° C.

It has been found, totally unexpectedly and very desirably, that it is possible to prepare the polyurethane polyols of this invention by directly alkoxylating polysaccharides having more than three monosaccharide units per molecule with a lower aliphatic epoxide in the absence of any inert solvent, if an aliphatic polyalcohol is utilized as a coreactant. Thus, the polyols provided by the present invention are prepared by reacting together in intimate admixture at temperatures of from about 100° C. to 175° C. and at autogeneous pressure or higher pressures (1) a saturated aliphatic polyalcohol having at least three carbon atoms and at least three hydroxyl groups, (2) a polysaccharide having more than three monosaccharide units per molecule, and (3) a terminal lower aliphatic 1,2-monoepoxide. In order to accelerate the reaction rate, the alkoxylation is desirably conducted in the presence of a basic catalyst. The presence of the aliphatic polyalcohol is essential to the reaction. Although I do not wish to be bound by any theory, it appears that the aliphatic polyalcohol in addition to becoming alkoxylated itself provides a fluxing action which carries the polysaccharide into solution. If the aliphatic polyalcohol is omitted little epoxide becomes combined and the product is a solid which is unsuitable for the purpose of the present invention.

DESCRIPTION OF THE PREFERRED EMBODIMENTS

The aliphatic alcohols which are very suitable for use in the preparation of the high-functionality polyether polyols of the present invention are aliphatic polyols having at least three, and preferably at least four carbon atoms, and at least three, and preferably at least four, hydroxyl groups. Saturated aliphatic polyols having from three to six carbon atoms and from three to six hydroxyl groups are generally employed. Those aliphatic polyols having a melting point of about 125° C. or less are prefered. Examples of useful polyols are glycerol, erythriotol, sorbitol, mannitol, pentaerythritol, 1,2,6-hexanetriol, diglycerol, trimethylolethane, trimethylolpropane, triethanolamine, and triisopropanolamine. Especially preferred are glycerol, sorbitol, and a commercially available mixture of linear aliphatic polyols having an average molecular weight of about 160 and an average equivalent weight of about 32.

Mixtures of aliphatic polyalcohols are frequently useful and preferred in the preparation of the polyether polyols of the present invention.

Polysaccharides suitable or use in admixture with aliphatic polyalcohols in preparing the polyether polyols of this invention comprise homopolysaccharides and heteropolysaccharidies having at least three monosaccharide units, and preferably more than three monosaccharide units per molecule. The said monosaccharide units may have from 5 to 6 carbon atoms per unit, and preferably 6. In order to be suitable for use in the present invention the polysaccharides should advisably have a solubility in water at about 25° C. of at least 50 percent and advisably at least 75 percent, and preferably at least 90 percent by weight. Polysaccharides without the requisite solubility may be solubilized in situ by dispersing them in the aliphatic polyalcohol and heating this dispersion at a temperature of about 75° C. to 200° C. and preferably of about 125° C. to about 175° C. until the dispersion becomes clear. It is believed that in this solubilizing process of partial degradation of the higher insoluble polysaccharide, such as starch, to a somewhat lower solubilized polysaccharide may take place. The resulting viscous polysaccharide-polyalcohol solution is then reacted with the monoepoxide in the presence of a basic catalyst. Suitable soluble polysaccharides are those slected from the group consisting of linear, branched, and cyclic dextrins, plant gums, plant mucilages, dextrans, pectins, and solubilized starches. Molasses and corn syrup are also of use. The term dextrin is used herein and in the art to describe polysaccharide products of a complex nature resulting from the partial degradation of starch, such as corn starch, potato starch, wheat starch, and the like, in the presence of heat alone, e.g. by roasting, or in combination with acid, or by enzymes. Available linear and branched dextrins are produced in three types, depending on the heating time, temperature, and catalyst employed in the treatment of the starch. These types are calssified as white dextrins, yellow or canary dextrins, and British Gums, and all such dextrins are suitable. The term plant gum as used herein and in the art refers to naturally occurring plant exudates having a complex polysaccharide structure.

Representative of the polysaccharides which are useful are dried corn syrup solids, corn dextrins, potato dextrins, wheat dextrins, alpha-cyclodextrin, beta-cyclodextrin, gamma-cyclodextrin, tragacanthin, gum acacia, Ghatti gum, karaya gum, gum arabic, mesquite gum, damson gum, gum tragacanth, flaxseed mucilage, dextran and pectin, and the like. Examples of polysaccharides which lack solubility in water at 25° C. but which may be employed after being solubilized in the aliphatic polyalcohol are various starches, such as corn starch, wheat starch, potato starch, rice starch, tapioca starch, and the like. Particularly preferred in this embodiment is corn starch.

For optimum results in the preparation of polyurethane foams, the polysaccharides employed should not contain more than one percent by weight of water. However, most polysaccharides in the usual commercial form contain more than one percent by weight of water. These should be dried before use in the present procss. An especially useful embodiment of such moist polysaccharides involves solubilization of these polysaccharides with aliphatic polyalcohols, and concomitant dehydration during the heating which also results in the solubilization. The moisture content of the polysaccharide assists in the solubilization, and is easily removed by volatilization at the elevated temperature of the solubilization reaction.

For best results in the present invention, it is also advisable that the content of lower saccharides, such as mono-, di-, and tri-saccharides be very low and advisably be less than 10 percent by weight of the polysaccharide.

In the practice of this invention, a lower saccharide, such as a monosaccharide or a disaccharide, is generally unsuitable. This is the case because the use of such a lower saccharide leads to a product which is not much different from that derived from the aliphatic polyol alone. Thus, the foams prepared from the polyether polyols which incorporate the lower saccharides have deficient physical properties.

The use of a monosaccharide, such as dextrose or methyl glucoside, is especially undersirable. Not only does the use of such a material lead to a polyol which produces a polyurethane composition differing only slightly from those made from alcohol-derived polyether polyols, but unexpectedly and undesirably, the viscosities of the monosaccharide-derived polyether polyols are very high. The monosaccharide-derived polyols are about as viscous as those derived from disaccharides, and are not very much less than those derived from high polysaccharides. It is believed that the monosaccharide rings are somewhat unstable under the present reaction conditions, and that they participate in undesirable side reactions.

Preferred for use in the present invention are the yellow or canary corn dextrins, the white corn dextrins, the cyclodextrins, and corn starch. Particularly preferred are canary corn dextrin, white corn dextrin and corn starch, because of their high reactivity, low cost, ready availability, and good properties in the final polyurethane composition.

Particularly suitable, among the lower aliphatic monoepoxides contemplated for use in preparing the polyols of this invention, are the saturated terminal lower aliphatic epoxide having from two to six carbon atoms. Examples of suitable epoxides are ethylene oxide, propylene oxide, and 1,2-butylene oxide. Mixtures of epoxides, may be employed. Particularly preferred for use is propylene oxide because the polyols prepared therefrom result in polyurethane compositions with superior properties.

In order to accelerate the rate of alkoxylation, a basic catalyst is preferably employed. Suitable basic catalysts comprise tertiary amines, quaternary ammonium hydroxides, alkali metal oxides, hydroxides, and alkoxides, alkaline earth metal hydroxides, and the like. In general, basic catalysts known in the alkoxylation art are useful in the preparation of the polyether polyols of the present invention. Preferred tertiary amines will have from one to three nitrogen atoms and from three to 18 carbon atoms, and may contain oxygen-containing substituents, such as ether radicals or hydroxyl radicals. Aliphatic tertiary amines are particularly preferred. If aromatic hydrocarbon radicals are present, they should not be attached directly to the tertiary nitrogen atoms. Examples of suitable tertiary amines are trimethylamine, triethylamine, tripropylamine, tetramethyl-1,3-butanediamine, triethylenediamine, benzyldimethylamine, dimethylaminomethylphenol, tris(dimethylaminomethyl) phenol, N-methyl morpholine, N-ethyl morpholine, N,N'-dimethyl piperazine, and tetramethylguanidine.

Suitable quaternary ammonium hydroxides are benzyltrimethylammonium hydroxide, hydroxyethyltrimethylammonium hydroxide, and the carbonate salts of these quaternary hydroxides.

Suitable caustic alkalies are sodium hydroxide and potassium hydroxide, for example.

Particularly preferred catalysts are trimethylamine, triethylamine, tetramethylguanidine, and the tertiary amines having the benzyldimethylamine radical.

In preparing the high-functionality polyether polyols of the present invention the presence of water and atmospheric oxygen is advisably excluded and any moisture content of the reactants should be eliminated before use in the reaction. The reaction may be conducted by intimately admixing all reactants at the start of the reaction, or it may be desirable to add only a fraction of the epoxide or a fraction of the catalyst initially and to add the remainder of the epoxide or additional catalyst as the reaction progresses. Also, one epoxide can be added initially and another epoxide later during the reaction. It is advisable, however, to have the total amount of the aliphatic polyol and of the polysaccharide and a certain amount of catalyst present at the start of the reaction.

Temperatures ranging from about 75° C. to about 175° C., and preferably from about 125° C. to 150° C. are employed. Reaction pressures will be autogeneous or higher, and will generally range from about 15 to 300 pounds per square inch. The reaction is suitably conducted in a reactor equipped with means of heating, cooling, and agitating.

The length of reaction time will usually vary from about 1 hour to about 24 hours, and will usually not exceed about 10 hours. The reaction time primarily depends on the nature and amount of catalyst used, the amount and type of epoxide employed, and the reaction temperature.

The proportion of polysaccharide will generally range from about 5% to about 90% by weight of the weight of the polysaccharide-aliphatic polyalcohol mixture. Less than 5% of polysaccharide may be employed, but the resultant polyether polyol differs only relatively little from that prepared from the aliphatic polyol alone. On the other hand, if more than 90% of polysaccharide is used, the reaction of the polysaccharide is relatively slow, and the viscosity of the resulting polyether polyol is unsatisfactory.

The especially preferred proportion of polysaccharide will range from about 20% to about 65% by weight of the combined weight of the polysaccharide-aliphatic polyalcohol mixture. Compositions prepared using this range are processed quickly, the resulting viscosity and compatibility are satisfactory, and the resulting polyurethanes made therefrom have especially desirable properties.

The minimum amount of epoxide will be such that the ratio of mols of chemically combined epoxide to equivalents of hydroxyl groups in the polysaccharide-aliphatic polyalcohol reactant mixture will generally range from about 1.0 to about 3.0. This range of combined epoxide per hydroxyl equivalent results in the desired equivalent weight of from about 90 to 200 for the resulting polyether polyol. An excess of epoxide may be employed and recovered or vented.

The amount of catalyst is not critical. An amount of about 0.05 percent up to about 10 percent, and preferably not more than 5 percent, of the weight of the total reactant mixture may be used. The preferred range is in the region of 0.1 to 2 percent, depending on the reactants used, and the reaction temperature employed.

If an amine is used as the catalyst, the resulting polyether polyol may be ready for use immediately after the completion of the oxyalkylation reaction without further purification, by simply stripping off the volatile components which consist mainly of unreacted epoxide and amine catalyst. If an inorganic catalyst is used, or if the polysaccharide or aliphatic polyalcohol employed contains an excessive amount of ash, it may be desirable to de-ash or de-ionize the resulting polyether polyol by methods known to the art, such as precipitation with tartaric acid, adsorption on active carbon, or by passing through an ion-exchange resin.

The high-functionality polyether polyols prepared by the process described hereinabove are comprised essentially of a mixture of oxyalkylated aliphatic polyalcohol together with the oxyalkylated polysaccharide. In each component an average of about 1.0 to about 3.0 of 1,3-oxyalkylene units have been attached to the residues bonded to the original hydroxy groups in the reactants.

It should be noted that the original polysaccharide may contain carboxyl groups as well as hydroxyl groups. These carboxyl groups react to form hydroxyl chains, so that the general formula given above encompasses the acidic polysaccharides. Furthermore, it should be noted that the acidic groups do not interfere with the reaction of the instant invention.

The essential components of the polyether polyol mixture are represented by the general formulae presented hereinabove. Other minor constituents arising from non-reactive components in the polysaccharide employed may additionally be present, particularly if relatively unprocessed polysaccharides from natural sources are used directly. Alkoxylation products of small amounts of lower saccharides, such as mono-, di-, and tri-saccharides present as minority constituents in the polysaccharide employed, may also be present. For purposes of the instant specification and claims, such minor impurity constituents, amounting to less than about 10 percent by weight of the total polyol are to be regarded as non-essential and non-interfering, and are within the scope of the invention.

Suitable polyether polyols will be composed of from about 50 percent to 80 percent by weight, and preferably from about 60 to 75 percent by weight, based on the total polyol weight, of 1,3-oxyalkylene units —O—R—, with the remainder of the polyol consisting essentially of (1) residues derived from the saturated aliphatic polyalcohol and (2) polysaccharide residues, with the latter constituting from 5 to 90 percent by weight, and preferably from 20 to 65 percent by weight, of the remainder. The average equivalent weight of the mixture will be in the range of 90 to 200, with the average equivalent weight of the preferred polyols falling within the range of 100 to 160, and more frequently within the range of 120 to 150. Thus, the average hydroxyl number will range from 280 to 620, and preferably from 350 to 560, and frequently from 370 to 470. The number-average functionality, determined by measuring the total equivalents of hydroxyl groups in the polyol and dividing this number by the number of mols of polyol molecules is at least about 5, and preferably at least six, and more desirably is at least eight. This number-average functionality may be as high as about 25 but frequently does not exceed fifteen. This number-average functionality is not identical with the weighted-average functionality previously defined. I have found that the weighted-average functionality is more important in determining the utility of the polyether polyols as polyurethane components.

The polyether polyols described hereinabove are very useful for the preparation of polyurethane compositions by reaction with suitable organic polyisocyanates. The polyurethanes are prepared from the polyether polyols and organic polyisocyanates by mixing and reacting these materials in accordance with the standard techniques known to the art. Other conventional coreactants, and standard additives and catalysts may also be used with the polyols of the present invention. For example, references which disclose the preparation of polyurethane compositions, and the suitable materials and techniques are U.S. Pats. 2,779,-689; 2,785,739; 2,787,601; 2,788,335; 3,079,350; the bulletin "Rigid Urethane Foams, II, Chemistry and Formulation" by C. M. Barringer, HR–26, Elastomer Chemicals Department, E. I. du Pont Co., April 1958, and the books by J. H. Saunders and K. C. Frisch "Polyurethanes, Chemistry and Technology," Interscience, New York, N.Y. 1962.

Polyurethanes may be prepared from the instant polyether polyols in the form of castings or in the form of coatings on a suitable substrate. Rigid polyurethane foams with particularly desirable properties are prepared by reaction of the polyether polyols of this invention with an organic polyisocyanate in the presence of a suitable catalyst, such as a tertiary amine catalyst or an organotin catalyst, a blowing agent, such as butane or a halocarbon, and a surfactant, such as a polyoxyethylene-silicone copolymer. Because of the very high functionality of the instant polyols, polyurethane foams prepared from them have very outstanding dimensional stability, even when using difunctional diisocyanates. In addition, the very high functionality of these polyols makes it possible to utilize higher equivalent weights in the preparation of rigid polyurethane foams having acceptable physical properties.

The present polyols are also very useful as a component in blends of polyols. The instant polyols are particularly useful in increasing the functionality and decreasing the viscosity of such blends. They also increase the compatibility of the blends with other reactants used in the preparation of the polyurethane products herein contemplated.

The following examples are presented to illustrate the invention, but not to limit the scope of breadth of the discovery.

EXAMPLE 1

This example illustrates the difficulty of utilizing a higher polysaccharide alone as an ingredient in the formation of a polyether polyol.

In a 1-liter, 316 stainless steel, pressure vessel equipped with agitation was placed 41.1 grams of oven-dried canary corn dextrin (having a solubility of 95% in water), 188 grams of propylene oxide, and 3.1 grams of triethylamine. The vessel was then sealed and heated at 260–300° F. for 2½ hours with agitation. The vessel was then vented and the residual material recovered. The recovered material weighed 58 grams, and was soft brown solid.

EXAMPLE 2

Using the same vessel and procedure as in Example 1, the raw materials were 50.5 grams of dried canary corn dextrin, 44.9 grams of a commercial mixture of linear aliphatic polyalcohols having from 3 to 6 carbon atoms, and with an average molecular weight of 160 and an average hydroxy equivalent weight of 31.9, 196 grams of propylene oxide, and 1.1 grams of triethylamine.

The vessel was heated at 250–285° F. for 4 hours, and then vented. The product weighed 224 grams, and was amber in color, and was clear. This product had a viscosity of 410,000 centipoises at 27° C., and a theoretical equivalent weight of 93.

Example 2 was repeated using 45.2 grams of glycerol as the aliphatic polyol. The product had a viscosity of 350,000 centipoises at 26° C.

Substitution of 44.8 grams of anhydrous sorbitol or of 60.3 grams of trimethylolpropane for the aliphatic polyol mixture in Example 2 yielded similar results.

EXAMPLE 3

Using the same apparatus and techniques as in Example 1, the raw materials were 68.7 grams of oven-dried canary corn dextrin, 79.3 grams of the commercial mixture of aliphatic polyols used in Example 2, 450 grams of propylene oxide, and 3.8 grams of dimethylaminomethyl phenol.

The vessel was heated to 270° F., from which point a vigorous exotherm carried the temperature to 325° F. The vessel was then cooled to 270–290° F. and held at this temperature range for an additional 2 hours, and then vented.

The product weighed 449 grams, had a theoretical equivalent weight of 116, and had a viscosity of only 39,600 centipoises at 16° C.

Example 3 was repeated substituting spray-dried cornsyrup solids, dextrose equivalent 43, weight-for-weight in place of the corn dextrin. The results were very similar, except for a viscosity about 10% lower, in this case.

Example 3 was repeated using an equal weight of oven-dried β-cyclodextrin (derived from potato starch) in place of the corn dextrin. The product was similar to that of Example 3, but was lighter in color.

EXAMPLE 4

Using the same equipment and procedure as used in Example 1, the raw materials were 65.0 grams of dried canary corn dextrin, 74.0 grams of the commerical aliphatic polyol used in Example 2, 451 grams of propylene oxide, and 3.1 grams of dimethylbenzylamine. The vessel was heated at 265–300° F. for 2½ hours, and vented.

The product was similar in viscosity to that of Example 3, and weighed 432 grams.

This example was repeated using 500 grams of 1,2- butylene oxide in place of the propylene oxide. The results were very similar to those of Example 4.

EXAMPLE 5

The equipment and procedure used in Example 1 were again used. The raw materials were 44.3 grams of dried canary corn dextrin, 56.2 grams of the commercial aliphatic polyol mixture of Example 2, 291 grams of propylene oxide and 0.7 gram of triethylene diamine.

The vessel was heated at 260–300° F. for 2 hours and 45 minutes, and then vented.

The product weighed 180 grams and was a very viscous fluid.

EXAMPLE 6

The equipment and procedure of Example 1 were employed. The raw materials were 63.4 grams of dried canary corn dextrin, 93.5 grams of the commercial aliphatic polyalcohol mixture of Example 2, 461 grams of propylene oxide, and 2.1 grams of tetramethylguanidine. The vessel was heated to 265° F., from which point an exotherm carried the temperature to 300° F. The temperature was maintained in the range of 300–310° F. for 15 minutes, using external cooling, and the vessel was then maintained at 260–280° F. for an additional 1 hour and 30 minutes, and was then vented.

The product weighed 615 grams, and was amber and clear, and had a viscosity of 15,600 centipoises at 17° C. The theoretical equivalent weight was 146.

Example 6 was repeated, using trimethylamine as the catalyst in place of the tetramethylguanidine. The results were very similar.

EXAMPLE 7

This example illustrates the use of a quaternary ammonium hydroxide as the catalyst in the preparation of the instant polyether polyols. The apparatus and procedure used in Example 1 were used. The raw materials were 73.4 grams of oven-dried canary corn dextrin, 90.9 grams of the commercial aliphatic polyol mixture of Example 2, 308 grams of propylene oxide, and 2.9 grams of a 40% solution of benzyltrimethylammonium hydroxide in methanol. The mixture was heated at 280–305° F. for 4½ hours, and then vented. The clear, amber-colored product weighed 450 grams. The theoretical equivalent weight is 104.

EXAMPLE 8

Using the same apparatus and procedure as in Example 1, the raw materials were 47.4 grams of dried canary corn dextrin, 74.6 grams of the aliphatic polyol mixture of Example 2, 292 grams of propylene oxide and 1.5 grams of trimethylamine. The reaction mixture was heated at 260–300° F. for 3½ hours. The product was clear and amber in color, and weighed 400 grams. The viscosity was about 5000 centipoises at 25° C., and the theoretical equivalent weight is 121.

EXAMPLE 9

The polyol of Example 3, 63.2 grams, was mixed with 20.2 grams of fluorotrichloromethane, 1.0 gram of silicone fluid DC–193 (a dimethyl-silicone-polyethylene glycol copolymer), 1.2 grams of a solution of 20% triethylene diamine in diemthyl-amino ethanol, and 61.4 grams of MT–40, a 50–50 mixture of tolylene diisocyanate and polyphenylene polyisocyanate.

The mixture creamed in 25 seconds, and had a rise and tack-free time of 100 seconds. The foam was slightly scratch friable in 5 minutes, and had a core desnity of 1.80 pounds per cubic foot. The cured foam was unaffected by exposure to −10° C., and had a slow, even shrinkage of about 2% by volume when exposed to 90–100 percent relative humidity at 70° C. for 28 days.

EXAMPLE 10

A clear solution was prepared by mixing and heating at 140° C. a suspension of 75.2 grams of air-dried pearl corn starch, and 80.7 grams of the commercial mixture of aliphatic polyols used in Example 2. The suspension became clear after about 30 minutes of heating. This clear solution was then reacted with 450 grams of propylene oxide, using 3.6 grams of dimethylaminomethyl phenol as the catalyst, and the procedure of Example 3.

The product had a viscosity of approximately 100,000 centipoises, and a theoretical equivalent weight of about 115. This polyol resulted in a rigid polyurethane foam with greater hardness and better dimensional stability than the already excellent foam of Example 9.

Having thus described my invention, I claim:

1. A polyether polyol consisting essentially of a (1) from 10 to 95 percent by weight of an oxyalkylated aliphatic polyalcohol of the general formula:

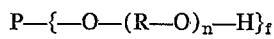

and (2) from about 90 to 5 percent by weight of an oxyalkylated polysaccharide of the general formula:

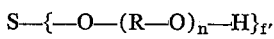

wherein P is identical with the organic residue P attached to the alcoholic hydroxyl groups in a saturated aliphatic polyalcohol $P(OH)_f$ having from three to nine carbon atoms, S is the organic residue attached to the active-hydrogen-containing groups of a polysaccharide having at least three monosaccharide units per molecule, $f$ and $f'$, the functionalities, are positive integers with $f$ having a minimum value of at least three and $f'$ having a minimum value of at least 11, R represents a saturated aliphatic 1,2-alkylene radical of from two to six carbon atoms and the general formula:

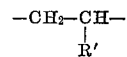

with R′ being a saturated lower alkyl radical, and $n$ is a positive number with an average value ranging from about 1.0 to about 3.0.

2. A polyether polyol according to claim 1 in which said organic residue S is derived from a polysaccharide having a solubility in water at 25° C. of at least about 50 percent by weight.

3. A polyether polyol according to claim 1 in which said residue P is derived from a saturated aliphatic polyalcohol having from 3 to six carbon atoms and from three to six hydroxyl groups and said organic residue S is derived from a polysaccharide selected from the group consisting of linear, branched, and cyclic dextrins.

4. A polyether polyol according to claim 1 in which R′ is methyl.

5. The polyether polyol according to claim 3 in which R′ is methyl.

6. The polyether polyol according to claim 3 in which said polysaccharide residue S is derived from a yellow corn dextrin.

7. The polyether polyol according to claim 3 in which said polysaccharide residue S is derived from a white corn dextrin.

8. The polyether polyol according to claim 3 in which said polysaccharide residue S is derived from a British Gum.

9. A polyether polyol according to claim 1 in which said residue P is derived from a saturated aliphatic polyalcohol having from three to six carbon atoms and from three to six hydroxyl groups and said organic residue S is derived from a starch.

10. A poyether polyol according to claim 9 in which R′ is methyl.

11. A polyether polyol according to claim 9 in which said polysaccharide residue S is derived from corn starch.

12. A polyether polyol according to claim 9 in which said polysaccharide residue S is derived from potato starch.

13. A polyether polyol according to claim 9 in which said polysaccharide residue S is derived from wheat starch.

References Cited
UNITED STATES PATENTS

| | | | |
|---|---|---|---|
| 2,902,478 | 9/1959 | Anderson | 260—209 |
| 3,051,691 | 8/1962 | Elizer et al. | 260—209 |
| 3,169,934 | 2/1965 | Dennett et al. | 260—209 |
| 3,223,699 | 12/1965 | Schlageter | 260—209 |
| 3,277,076 | 10/1966 | Yotsuzuka | 260—209 |
| 3,305,535 | 2/1967 | Merten et al. | 260—209 |
| 3,326,890 | 6/1967 | Engelskirchen et al. | 260—209 |

LEWIS GOTTS, Primary Examiner

J. R. BROWN, Assistant Examiner

U.S. Cl. X.R.

260—2.5, 77.5, 209.5, 233.3